(12) United States Patent
Alegre et al.

(10) Patent No.: US 11,732,367 B2
(45) Date of Patent: Aug. 22, 2023

(54) SELECTIVELY REMOVABLE MARINE ENGINE ANODE

(71) Applicant: Zimar International, Inc., Davie, FL (US)

(72) Inventors: Jose Alegre, Davie, FL (US); Juan Carlos Alegre, Davie, FL (US)

(73) Assignee: ZIMAR INTERNATIONAL, INC, Davie, FL (US)

( * ) Notice: Subject to any disclaimer, the term of this patent is extended or adjusted under 35 U.S.C. 154(b) by 882 days.

(21) Appl. No.: 16/704,882

(22) Filed: Dec. 5, 2019

(65) Prior Publication Data

US 2021/0172073 A1 Jun. 10, 2021

(51) Int. Cl.
*C23F 13/00* (2006.01)
*C23F 13/18* (2006.01)
*C23F 13/10* (2006.01)

(52) U.S. Cl.
CPC ............ *C23F 13/005* (2013.01); *C23F 13/10* (2013.01); *C23F 13/18* (2013.01); *C23F 2213/31* (2013.01)

(58) Field of Classification Search
CPC .......... C23F 13/10; C23F 13/14; C23F 13/16; C23F 13/18
See application file for complete search history.

(56) References Cited

U.S. PATENT DOCUMENTS

| | | | | |
|---|---|---|---|---|
| 2,805,987 A * | 9/1957 | Thorn, Jr. | ............... | C23F 13/18 204/196.19 |
| 4,051,007 A * | 9/1977 | Hossle | .................... | C23F 13/22 204/196.15 |
| 4,083,583 A * | 4/1978 | Volgstadt | .............. | F24H 9/0005 285/55 |
| 9,322,102 B2 * | 4/2016 | McMullen | .............. | C23F 13/10 |
| 2005/0025608 A1 * | 2/2005 | Fedor | ...................... | C23F 13/18 411/337 |

FOREIGN PATENT DOCUMENTS

WO WO-2007083103 A2 * 7/2007 ............. B63B 59/00

* cited by examiner

*Primary Examiner* — Alexander W Keeling
(74) *Attorney, Agent, or Firm* — Mark C. Johnson; Johnson Dalal

(57) ABSTRACT

A selectively removable engine anode having a metallic anode base with a threaded configuration disposed proximal to a lower end thereon and on an outer surface, a flanged platform extending radially along a longitudinal length of the base to define an outer flange diameter, and a cantilevered retention member directly coupled to the flanged platform and having a diameter less than the outer flange diameter. The anode includes a galvanic anode with a first anode end coupled to the flanged platform, a second anode free end opposing the first anode end, and an anode length separating the first anode end and the second anode free end, wherein the galvanic anode and the flanged platform encapsulate the cantilevered retention member, the anode base is selectively removably couplable to a plug that is operably configured to be selectively coupled to a marine engine.

16 Claims, 6 Drawing Sheets

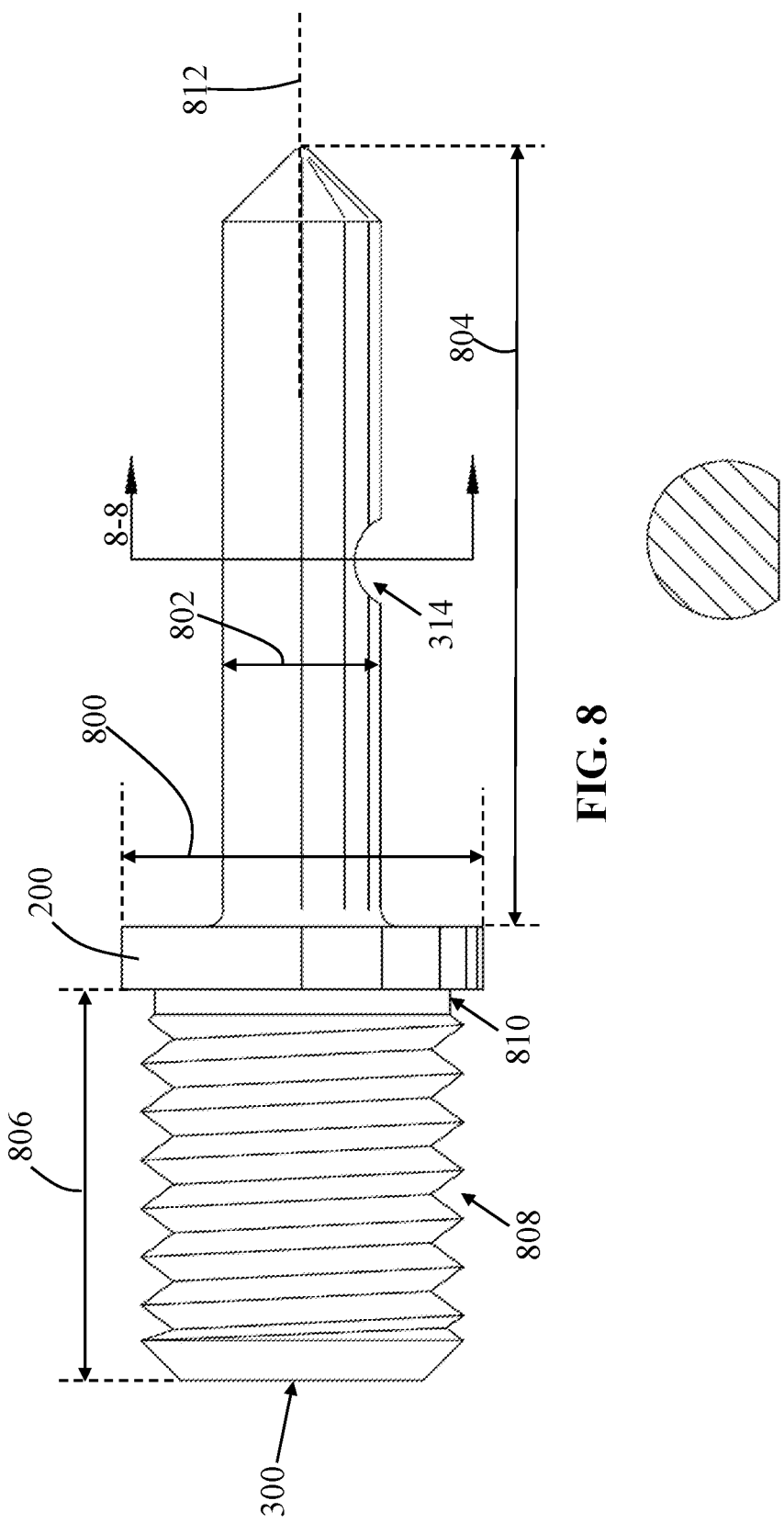

SELECTIVELY REMOVABLE MARINE ENGINE ANODE

FIELD OF THE INVENTION

The present invention relates generally to anodes for marine applications and, more particularly, relates to selectively removable pencil anodes for marine engines.

BACKGROUND OF THE INVENTION

Whether for commercial, private, or military applications, the engine of a marine vessel routinely experiences corrosion due to a metal's contact with salt and brackish water. To combat against corrosion, many vessels, along with other similar devices and assemblies, e.g., oil and gas offshore platforms, construction equipment, and materials handling equipment used to load and unload cargo, employ the use of anti-corrosive materials, systems, and methods. Marine engines, in particular, are at high-risk for experiencing corrosion, wherein said marine engines are typically composed of varying metals and alloys that wear out from rust and corrosion at different rates. One known method to lower the rate of corrosion and to improve the longevity of a marine engine, zinc rods and engine anodes (collectively "anodes") will be used.

One exemplary known anode is depicted in FIG. 1. These anodes primarily consist of a material, e.g., zinc, that offers the marine engine protection by essentially sacrificing itself to corrosion, instead of the marine engine. More specifically, the zinc anode 100 may consist of 99.99% or higher of zinc and may be of a rod or cylindrical shape with a threaded end 102 operably configured to threadedly engage with a plug that is operably configured to threaded engage with an engine assembly. In one embodiment, the entire anode may be of the zinc material that may be placed on or around metal components to disrupt the saltwater's electrolyte current flow that causes corrosion. The anode will begin to corrode and rust, leaving the other important and expensive engine metal materials intact.

As seen in FIG. 1, the anode depicted therein is often referred to as a "pencil anode" due to its size and shape. Generally, the anode may consist of either a magnesium, aluminum, or zinc material. Magnesium has the most negative electro potential of the three (see galvanic series) and is more suitable for areas where the electrolyte (soil or water) resistivity is higher. This is usually onshore pipelines and other buried structures, although it is also used on boats in fresh water and in water heaters. Zinc and aluminum are generally used in saltwater, where the resistivity is generally lower. Typical uses are for the hulls of ships and boats, offshore pipelines and production platforms, in salt-water-cooled marine engines, on small boat propellers and rudders, and for the internal surface of storage tanks.

Zinc, however, is considered a reliable material, but is not suitable for use at higher temperatures, as it tends to passivate (the oxide formed shields from further oxidation); if this happens, current may cease to flow, and the anode stops working. Zinc has a relatively low driving voltage, which means in higher-resistivity soils or water it may not be able to provide sufficient current. However, in some circumstances—where there is a risk of hydrogen embrittlement, for example this lower voltage is advantageous, as overprotection is avoided. When employed as a rod, or pencil anode, the rod will be both dense and heavy to ensure that it remains attached to the metal component and will last for a very long time when submerged in saltwater. However, in time the zinc will completely corrode away.

Regardless the material, those known pencil anodes have significant disadvantages and drawbacks. In many instances, the pencil anode becomes significantly corroded if not changed right away, thereby bonding with the plug it is attached to. Therefore, to replace the pencil anode, the user is also required to replace the plug. This is a costly and time-consuming endeavor for the user. Furthermore, when attempting to remove these corroded pencil anodes, most will be become brittle and break, thereby preventing the anode from being completely removed. This too requires complete replacement of the plug and also generates debris that can be harmful to the user replacing the anode and can also damage the engine.

Therefore, a need exists to overcome the problems with the prior art as discussed above.

SUMMARY OF THE INVENTION

The invention provides a selectively removable marine engine anode that overcomes the hereinafore-mentioned disadvantages of the heretofore-known devices and methods of this general type and that enables effective, efficient, safe and convenient coupling and uncoupling of an anode to an engine motor, in particular a marine engine motor.

With the foregoing and other objects in view, there is provided, in accordance with the invention, a selectively removable engine anode having an anode base having a first end, a second end opposing the first end, a longitudinal length separating the first and second ends, a threaded configuration disposed proximal to the first end and on an outer surface of the anode base, a flanged platform extending radially along the longitudinal length to define an outer flange diameter, and a cantilevered retention member with first member end directly coupled to the flanged platform, including the second end of the anode base, and defining a retention member diameter less than the outer flange diameter. The assembly also includes a galvanic anode with a first anode end coupled to the flanged platform, a second anode free end opposing the first anode end, and an anode length separating the first anode end and the second anode free end, wherein the galvanic anode and the flanged platform encapsulating the cantilevered retention member.

In accordance with a further feature of the present invention, the galvanic anode is of a cylindrical shape and has a uniform diameter spanning the anode length.

In accordance with yet another feature of the present invention, the outer flange diameter and the uniform diameter are substantially identical.

In accordance with an additional feature of the present invention, the galvanic anode is substantially of at least one of a zinc material, an aluminum material, and a magnesium material.

In accordance with another feature, an embodiment of the present invention includes the cantilevered retention member also includes a retention member length separating the first member end and the second end, wherein the second end is the terminal end of the cantilevered retention member and an arcuate notch defined thereon along the retention member length, wherein the arcuate notch having a portion of the galvanic anode disposed therein.

In accordance with yet another feature, an embodiment of the present invention also includes the cantilevered retention member having a distal portion continually tapering in diameter until reaching the terminal end of the cantilevered retention member.

In accordance with an additional feature, an embodiment of the present invention also includes the flanged platform having a lower surface and an upper surface opposing the lower surface and substantially planar.

In accordance with an exemplary feature, an embodiment of the present invention also includes an engine plug having a lower end, an upper end defining a plug aperture and opposing the lower end, a plug length separating the lower and upper ends of the engine plug, and defining and enclosing, with a plug inner sidewall surface, a plug channel spanning from the plug aperture into engine plug along the plug length. The engine plug also has an outer threaded configuration disposed proximal to the upper end of the engine plug and on an outer surface of the engine plug and having an inner threaded configuration disposed proximal to the upper end of the engine plug and on the plug inner sidewall surface, the inner threaded configuration of the engine plug selectively removably coupled to the threaded configuration of the anode base and the outer threaded configuration of the engine plug operably configured to be selectively removably couplable to a threaded engagement on a marine engine.

In accordance with yet another feature, an embodiment of the present invention also includes the anode base having an attachment portion with the threaded configuration disposed thereon, including an upper end disposed proximal to the flanged platform, including the first end, and defining an attachment length separating the first end and the upper end of the attachment portion, wherein the plug channel only partially spans the plug length and is of a length greater than the attachment length.

In accordance with an additional feature, an embodiment of the present invention also includes the engine plug having a polygonal nut disposed proximal to the lower end of the engine plug and surrounding the attachment portion.

The present invention also includes a selectively removable engine anode having an anode base of a substantially rigid metallic material having a first end, a second end opposing the first end, a longitudinal length separating the first and second ends, a threaded configuration disposed proximal to the first end and on an outer surface of the anode base, a platform disposed on the longitudinal length, and a cantilevered retention member. The cantilevered retention member extends upwardly from the platform, has the second end of the anode base, and has a retention member length separating the second end and the platform, wherein the second end is the terminal end of the cantilevered retention member. The cantilevered retention member also defines an arcuate notch defined thereon along the retention member length. The assembly also has a galvanic anode with a second anode free end and surrounding and directly coupled to the cantilevered retention member, wherein the arcuate notch has a portion of the galvanic anode disposed therein.

In accordance with an additional feature, an embodiment of the present invention also includes the platform having a flanged portion spanning circumferentially and extending radially along the longitudinal length of the anode base to define an outer flange diameter, wherein the cantilevered retention member includes a first member end directly coupled to the flanged portion of the platform and defines a retention member diameter less than the outer flange diameter.

In accordance with yet another feature, an embodiment of the present invention also includes the galvanic anode having a first anode end coupled to the flanged platform and opposing the second anode free end and having an anode length separating the first anode end and the second anode free end, the galvanic anode and the flanged platform encapsulating the cantilevered retention member.

Although the invention is illustrated and described herein as embodied in a selectively removable marine engine anode, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the anode assembly or galvanic anode, spanning from the upper and lower ends thereon. As used herein, the term "wall" is intended broadly to encompass continuous structures, as well as, separate structures that are coupled together so as to form a substantially continuous external surface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 8 is an elevational side view of the engine anode base depicted in FIG. 3 in accordance with an exemplary embodiment of the present invention;

FIG. 9 is a cross-sectional view of the engine anode base in FIG. 8 along section lines 8-8 in accordance with one embodiment of the present invention;

DETAILED DESCRIPTION

Figure 1:
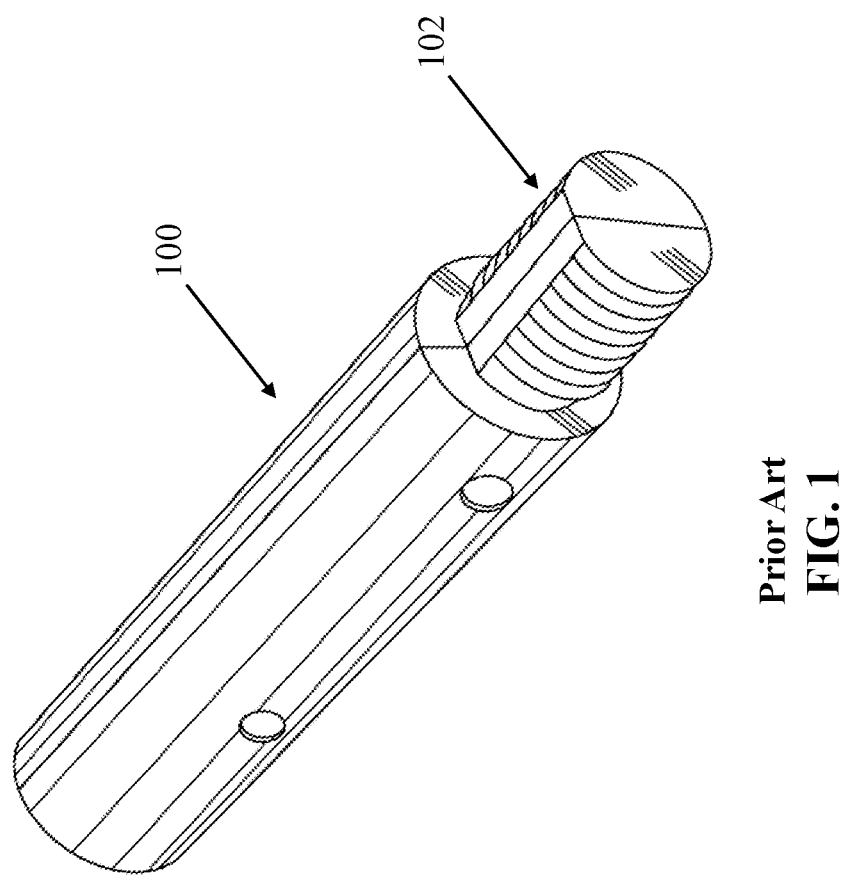
FIG. 1 is a perspective view of a prior art galvanic anode.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 3:
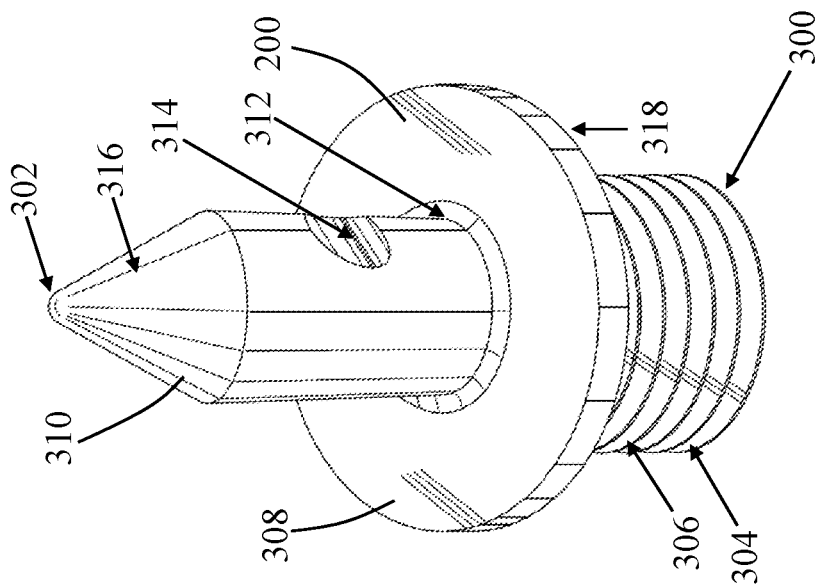
FIG. 3 is perspective close-up view of the anode base in FIG. 2 unattached to the galvanic anode in accordance with one embodiment of the present invention.
Figure 2:
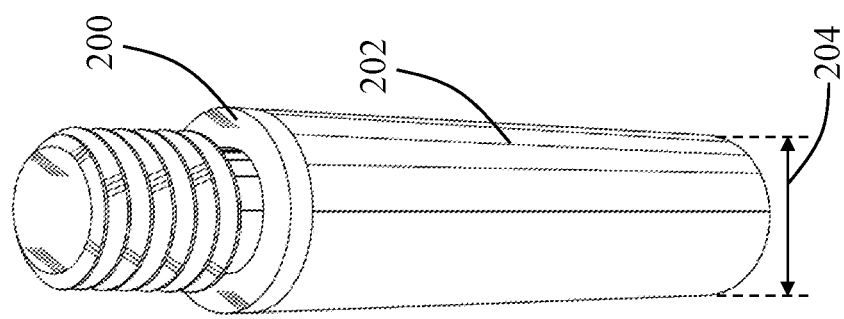
FIG. 2 is a perspective view of a selectively removable engine anode having an anode base and a galvanic anode coupled thereto in accordance with one embodiment of the present invention.
Figure 5:
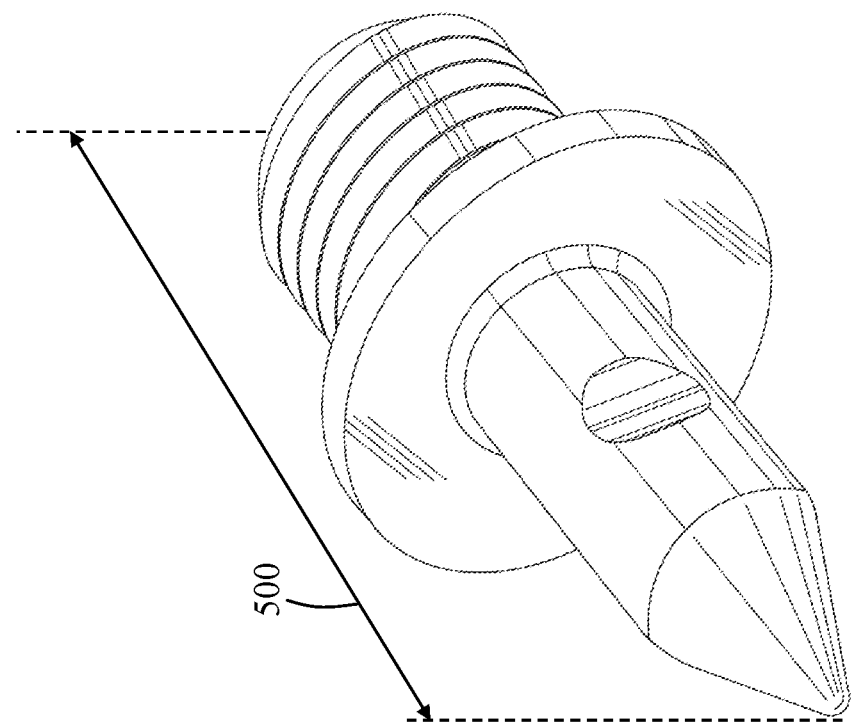
FIG. 5 is another perspective close-up view of the selectively removable engine anode in FIG. 3.

Referring now to FIGS. 2-3, one embodiment of the present invention is shown in perspective views. FIGS. 2-3 show several advantageous features of the present invention, but, as will be described below, the invention can be provided in several shapes, sizes, combinations of features and components, and varying numbers and functions of the components. The first example of a selectively removable engine anode 201 assembly, as shown in FIGS. 1-2, includes an anode base 200 coupled to a galvanic anode 202. With brief reference to FIGS. 6-7, it can be seen that the anode base 200 (and attached galvanic anode) is operably configured to selectively couple and uncouple to a plug 600 that is also operably configured to selectively couple and uncouple to a coupling member, e.g., threaded port, on a marine engine. As such, the user is able to quickly, effectively, and efficiently protect metal structures from corrosion using the galvanic anode 202.

The galvanic anode 202 may be made from a metal alloy with a more "active" voltage (more negative reduction potential/more positive electrochemical potential) than the metal of the structure desired to be protected. The difference in potential between the two metals means that the galvanic anode 202 corrodes, so that the galvanic anode 202 is consumed in preference to the structure. Generally, there are three main metals used as galvanic anodes, i.e., magnesium, aluminum and zinc. The anode base 200 and the plug 600 are preferably of a substantially rigid material, e.g., brass, bronze, stainless steel, or other (preferably conductive) metal, ceramic, or alloy, having a Rockwell B hardness of approximately 60-150.

Referring to FIGS. 2-3, FIGS. 5-6, and FIG. 8, the anode base 200 has a first end 300, a second end 302 opposing the first end 300, and a longitudinal length 500 separating the first and second ends 300, 302. In some embodiments, the "end" may be referred to as the terminal end of a component or object of the assembly 201. The anode base 200 also includes a threaded configuration 304 disposed proximal to the first end 300 and on an outer surface 306 of the anode base 200, thereby enabling coupling and rotational and/or linear translation. Said another way, the threaded configuration 304 may be disposed at or near, within approximately 10% of the overall length, the first end 300 of the anode base 200 and enable the anode base 200 to removably couple (in a locked configuration, at least longitudinally) with a plug 600 (shown in FIG. 6). Additionally, while the figures depict one threaded configuration, other threaded configurations are covered under said description, e.g., tongue-and-groove configurations, snap-fit configuration, etc.

The anode base 200 may also include a flanged platform 308 extending radially along the longitudinal length 500 to define an outer flange diameter 800. In other embodiments, the platform may be a juncture or point where the threaded configuration 304 spans into a cantilevered retention member 310 or section of the anode base 200. Beneficially, however, the flanged platform 308 generates an effective support, wall, and/or bonding surface for the galvanic anode 202, e.g., through an over molding, injection molding, casting, or other manufacturing process. The flanged platform 308 also prevents splashing when inserting or removing the assembly 201 into an engine port. In one embodiment, the platform 308 may circumferentially span around the cantilevered retention member 310, thereby forming an annular structure and support surface. The flanged platform 308 may include a lower surface 318 and an upper surface 320 opposing the lower surface 318, wherein the upper surface 320 is substantially planar, i.e., relatively flat to enable level attachment of the first anode end 400 of the galvanic anode 202 thereto (best shown in FIG. 4). The flanged platform 308, namely the upper surface 320 thereon, may radially project outwardly form the cantilevered retention member 310, or the longitudinal axis of the cantilevered retention member 310, at a substantially perpendicular angle, i.e., 90°+/−10°.

The cantilevered retention member 310 may also include a first member end 312 directly coupled to the flanged platform 308 and may also include the second end 302 of the anode base 200, which may be the terminal end, or tip, of the cantilevered retention member 310. With reference to FIG. 8, the cantilevered retention member 310 may also define a retention member diameter 802 less than the outer flange diameter 800, thereby enabling the galvanic anode 202 to effectively surround the cantilevered retention member 310 and be supported and/or couple/bond to the flanged platform 308. The cantilevered retention member 310 may also include a retention member length 804 separating the first member end 312 and the second end 302, wherein the second end 302 is the terminal end of the cantilevered retention member 310, and an arcuate notch 314 defined thereon along the retention member length 804. The concave notch 314, which preferably has a recess depth of approximately 0.025 inches or approximately 10% of the overall diameter, also enables the galvanic anode 202 to effectively surround and bond/couple with the cantilevered retention member 310. To that end, when completely assembled together, the arcuate notch 314 has a portion of the galvanic anode 202 disposed therein, thereby preventing inadvertent dislodgment or failure in the longitudinal direction or axis 812 of the cantilevered retention member 310. The concave or arcuate notch 316 may be of another shape, but said shape produces a higher adhesion bond and higher tensile failure point.

The cantilevered retention member 310 may also have a distal portion 316 continually tapering in diameter until reaching the terminal end or tip of the cantilevered retention member 310. In one embodiment, the distal portion 316 will begin tapering approximately 5-10% of the retention member length 804 and may have a tapering angle of approximately 45 with respect to the longitudinal direction or axis 812 of the cantilevered retention member 310.

Figure 4:
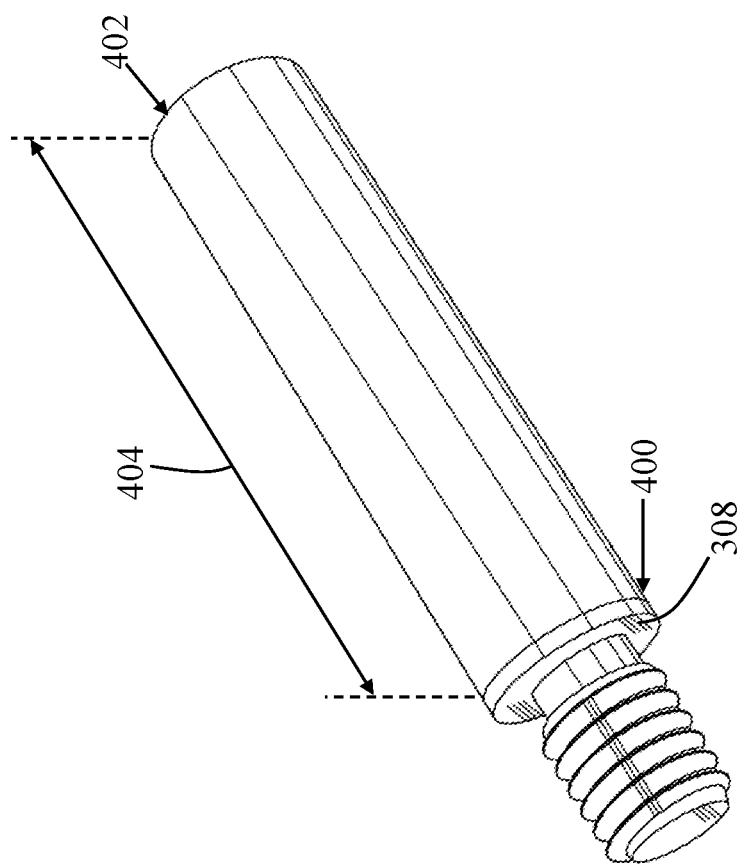
FIG. 4 is another perspective view of the selectively removable engine anode in FIG. 2.

As best seen in FIGS. 2-4, the galvanic anode 202 has a first anode end 400 coupled to the flanged platform 308, a second anode free end 402 opposing the first anode end 400, and an anode length 404 separating the first anode end 400 and the second anode free end 402. The anode length 404 may vary based on the design application and coupling constraints, but may be approximately 2-5 inches. The galvanic anode 202 may have a diameter of approximately 0.25-1 inches and may be of a cylindrical shape. In one embodiment, the galvanic anode 202 has a uniform diameter 204 spanning the anode length 404. Additionally, the outer flange diameter 800 and the uniform diameter 204 may also be of a substantially identical length, thereby enabling effective coupling thereto and easy insertion and removal of the engine anode 201 into a coupling port on a marine engine. When aimed at applications with high salinity, the galvanic anode 202 is substantially of a zinc material. However, in other embodiments, the galvanic anode 202 may be substantially of an aluminum material, a magnesium material, or other galvanic material. The galvanic anode 202 and the flanged platform 308 encapsulate the cantilevered retention member 310 when assembled together.

Figure 7:
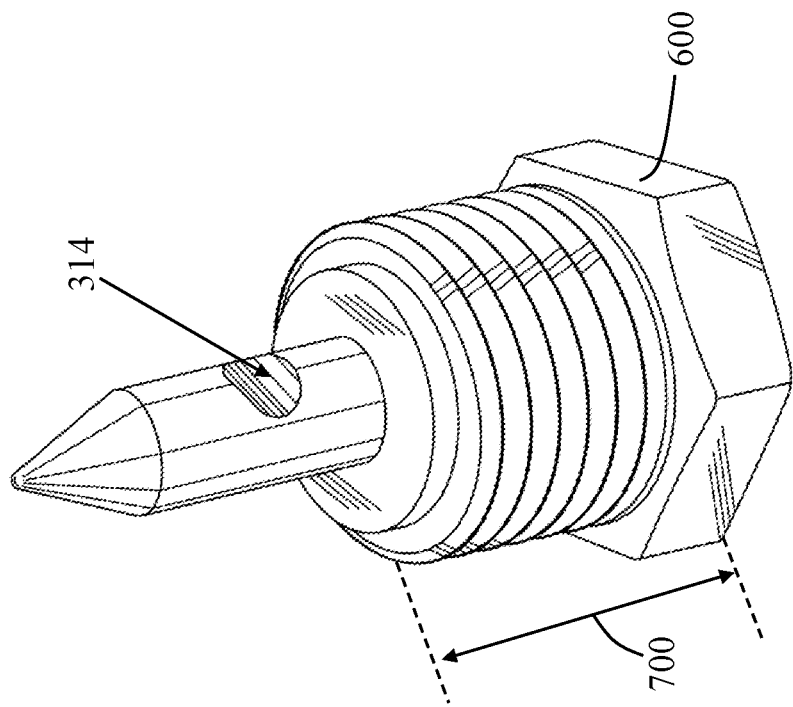
FIG. 7 is a perspective close-up view of the plug in FIG. 6 selectively removably coupled to the engine anode base depicted in FIG. 3 in accordance with one embodiment of the present invention.
Figure 6:
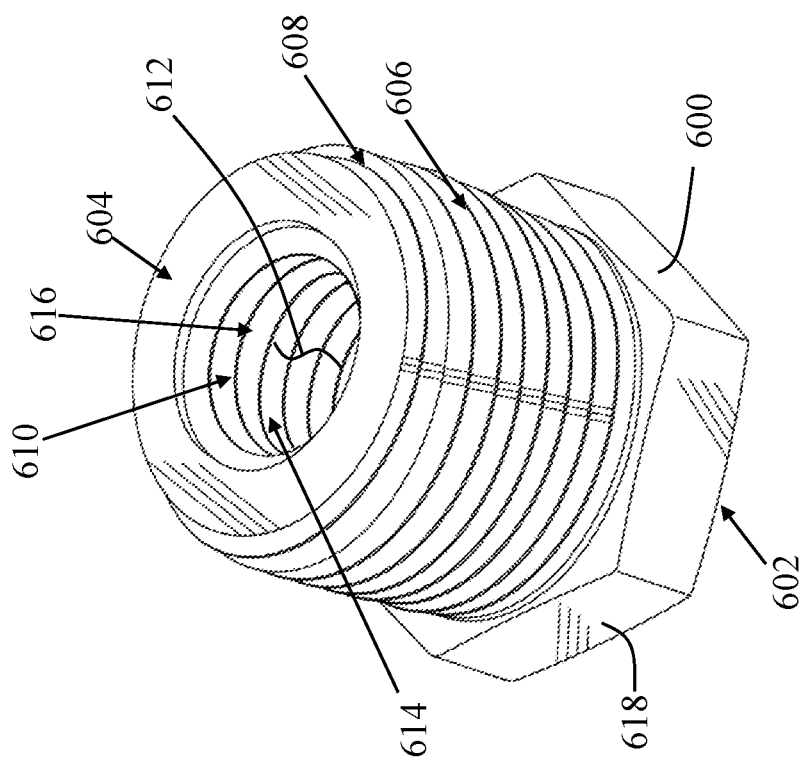
FIG. 6 is a perspective close-up view of a plug for use with the selectively removable engine anode depicted in FIG. 2 in accordance with one embodiment of the present invention.

As discussed above, the anode base 200 and galvanic anode 202 coupled to an engine plug 600 that is operably configured to be selectively removably couplable to a threaded engagement on a marine engine. With reference to FIGS. 6-8, the engine plug 600 also includes a lower end 602, an upper end 604, defining a plug aperture 610, and opposing the lower end 602. A plug length 700 is also defined by the lower and upper ends 602, 604 of the engine plug 600. In one embodiment, the plug length 700 may be approximately 0.5-2.5 inches. The plug 600 may also beneficially define and enclose a plug channel 612 spanning from the plug aperture 610 into engine plug 600 along the plug length 806. More specifically, it is the plug inner sidewall surface 614 that defines the plug channel 612. As seen in the figures, the engine plug 600 also includes an outer threaded configuration 606 disposed proximal to the upper end 604 of the engine plug 600 and on an outer surface 608 of the engine plug 600. The plug 600 also includes an inner threaded configuration 616 disposed proximal to the upper end 604 of the engine plug 600 and on the plug inner sidewall surface 614. As the figures depict, the inner threaded configuration 616 of the engine plug 600 may be beneficially selectively removably coupled to the threaded configuration 304 of the anode base 200 and the outer threaded configuration 606 may be beneficially selectively removably coupled to an engine port. As such, the user may now effectively, easily, and safely attach and detach a galvanic anode 202 to an engine port. Further, as shown in FIG. 1. FIG. 3, and FIG. 7, the inner threaded configuration of the engine plug 600 is selectively removably coupled to the threaded configuration of the anode base 200 and with the flanged platform 308 covering and adjacent to the first end 300 of anode base 200.

The anode base 200 may also have an attachment portion 808 with the threaded configuration 304 disposed thereon, including an upper end 810 disposed proximal to the flanged platform 308, and including the first end 300. The attachment portion 808 may defining an attachment length 806 separating the first end 300 and the upper end 810 of the attachment portion 808, wherein the plug channel 612 only partially spans the plug length 806 and is of a length greater than the attachment length 806. As such, the anode base 200 may effectively seat on the plug 600 in a watertight and/or sealed configuration (e.g., using the threaded configuration). The plug 600 may also include a rubber gasket enabling a watertight and/or sealed configuration with the motor port. To effectively tighten the plug 600 to the engine port, the engine plug 600 may also include a polygonal nut 618 disposed proximal to the lower end 602 of the engine plug 600 and surrounding the attachment portion 808.

Figure 11:
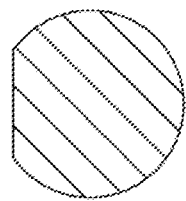
FIG. 11 is a cross-sectional view of the engine anode base in FIG. 10 along section lines 10-10 in accordance with one embodiment of the present invention.
Figure 10:
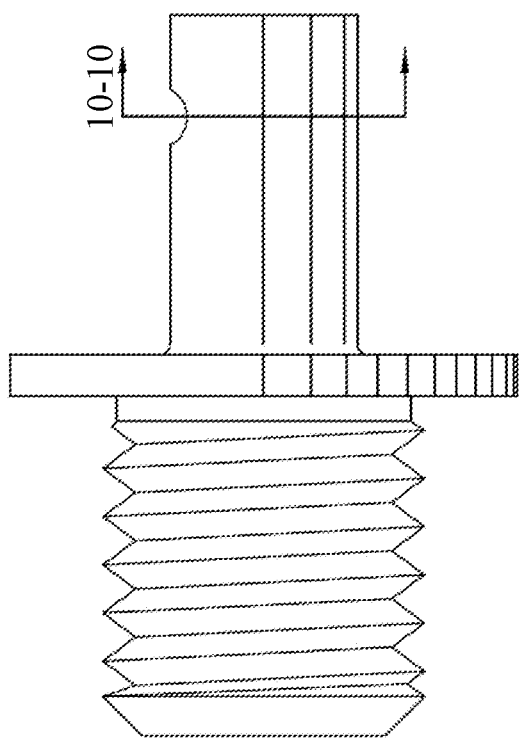
FIG. 10 is an elevational side view of an engine anode base in accordance with an exemplary embodiment of the present invention.

In one embodiment, the threaded configurations may be one of the following (in inches): ½, ⅝, ¾, ⅞, 1, 1⅛, etc., but should correspond with opposing threading as shown in the figures. Although the figures show a specific order of executing the process steps, the order of executing the steps may be changed relative to the order shown in certain embodiments. FIGS. 10-11 also depict another version, i.e., alternative dimensions, of the anode base. Also, two or more steps shown in succession may be executed concurrently or with partial concurrence in some embodiments. Certain steps may also be omitted for the sake of brevity. In some embodiments, some or all of the process steps can be combined into a single process.

Additionally, various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A selectively removable engine anode comprising:
an anode base having a first end, a second end opposing the first end, a longitudinal length separating the first and second ends, a threaded configuration disposed proximal to the first end and on an outer surface of the anode base, a flanged platform extending radially along the longitudinal length to define an outer flange diameter, and a cantilevered retention member with first member end directly coupled to the flanged platform, including the second end of the anode base, and defining a retention member diameter less than the outer flange diameter;

an engine plug having a lower end, an upper end defining a plug aperture and opposing the lower end, a plug length separating the lower and upper ends of the engine plug, and defining and enclosing, with a plug inner sidewall surface, a plug channel spanning from the plug aperture into engine plug along the plug length, the engine plug having an outer threaded configuration disposed proximal to the upper end of the engine plug and on an outer surface of the engine plug and having an inner threaded configuration disposed proximal to the upper end of the engine plug and on the plug inner sidewall surface, the inner threaded configuration of the engine plug selectively removably coupled to the threaded configuration of the anode base with the flanged platform covering and adjacent to the first end of the anode base, and a galvanic anode with a first anode end coupled to the flanged platform, a second anode free end opposing the first anode end, and an anode length separating the first anode end and the second anode free end, the galvanic anode and the flanged platform encapsulating the cantilevered retention member.

2. The selectively removable engine anode according to claim 1, wherein:
the galvanic anode is of a cylindrical shape.

3. The selectively removable engine anode according to claim 2, wherein:
the galvanic anode has a uniform diameter spanning the anode length.

4. The selectively removable engine anode according to claim 3, wherein:
the outer flange diameter and the uniform diameter are substantially identical.

5. The selectively removable engine anode according to claim 4, wherein:
the galvanic anode is substantially of at least one of a zinc material, an aluminum material, and a magnesium material.

6. The selectively removable engine anode according to claim 1, wherein the cantilevered retention member further comprises:
a retention member length separating the first member end and the second end, wherein the second end is the terminal end of the cantilevered retention member; and
an arcuate notch defined thereon along the retention member length, the arcuate notch having a portion of the galvanic anode disposed therein.

7. The selectively removable engine anode according to claim 6, wherein the cantilevered retention member further comprises:
a distal portion continually tapering in diameter until reaching the terminal end of the cantilevered retention member.

8. The selectively removable engine anode according to claim 7, wherein the flanged platform further comprises:
a lower surface and an upper surface opposing the lower surface and substantially planar.

9. The selectively removable engine anode according to claim 1, wherein the anode base further comprises:
an attachment portion with the threaded configuration disposed thereon, including an upper end disposed proximal to the flanged platform, including the first end, and defining an attachment length separating the first end and the upper end of the attachment portion, wherein the plug channel only partially spans the plug length and is of a length greater than the attachment length.

10. The selectively removable engine anode according to claim 9, wherein the engine plug further comprises:
a polygonal nut disposed proximal to the lower end of the engine plug and surrounding the attachment portion.

11. The selectively removable engine anode according to claim 1, wherein:
the galvanic anode is of a cylindrical shape and has a uniform diameter spanning the anode length.

12. A selectively removable engine anode comprising:
an anode base of a substantially rigid metallic material having a first end, a second end opposing the first end, a longitudinal length separating the first and second ends, a threaded configuration disposed proximal to the first end and on an outer surface of the anode base, a platform disposed on the longitudinal length, and a cantilevered retention member:
extending upwardly from the platform;
with the second end of the anode base;
with a retention member length separating the second end and the platform, wherein the second end is the terminal end of the cantilevered retention member; and
defining an arcuate notch defined thereon along the retention member length;

an engine plug having a lower end, an upper end defining a plug aperture and opposing the lower end, a plug length separating the lower and upper ends of the engine plug, and defining and enclosing, with a plug inner sidewall surface, a plug channel spanning from the plug aperture into engine plug along the plug length, the engine plug having an outer threaded configuration disposed proximal to the upper end of the engine plug and on an outer surface of the engine plug and having an inner threaded configuration disposed proximal to the upper end of the engine plug and on the plug inner sidewall surface, the inner threaded configuration of the engine plug selectively removably coupled to the threaded configuration of the anode base with the platform covering and adjacent to the first end of the anode base; and a galvanic anode with a second anode free end and surrounding and directly coupled to the cantilevered retention member, the arcuate notch having a portion of the galvanic anode disposed therein.

13. The selectively removable engine anode according to claim 12, wherein the platform further comprises:
a flanged portion spanning circumferentially and extending radially along the longitudinal length of the anode base to define an outer flange diameter, wherein the cantilevered retention member includes a first member end directly coupled to the flanged portion of the platform and defines a retention member diameter less than the outer flange diameter.

14. The selectively removable engine anode according to claim 13, wherein the galvanic anode further comprises:
a first anode end coupled to the flanged platform and opposing the second anode free end and having an anode length separating the first anode end and the second anode free end, the galvanic anode and the flanged platform encapsulating the cantilevered retention member.

15. The selectively removable engine anode according to claim 12, wherein the anode base further comprises:

an attachment portion with the threaded configuration disposed thereon, including an upper end disposed proximal to the flanged platform, including the first end, and defining an attachment length separating the first end and the upper end of the attachment portion, wherein the plug channel only partially spans the plug length and is of a length greater than the attachment length.

16. The selectively removable engine anode according to claim 15, wherein the engine plug further comprises:
a polygonal nut disposed proximal to the lower end of the engine plug and surrounding the attachment portion.

\* \* \* \* \*